Jan. 14, 1958 J. A. S. ROY ET AL 2,820,207
ELECTRIC ROTARY MULTICONTACT DEVICE
Filed Sept. 27, 1954 4 Sheets-Sheet 1

INVENTORS
JAMES A. S. ROY
DANIEL E. SCHWARTZ
BY
*J. O'Brien*
*F. L. Styner* ATTYS.

INVENTORS.
JAMES A. S. ROY
DANIEL E. SCHWARTZ

Jan. 14, 1958   J. A. S. ROY ET AL   2,820,207
ELECTRIC ROTARY MULTICONTACT DEVICE
Filed Sept. 27, 1954   4 Sheets-Sheet 4
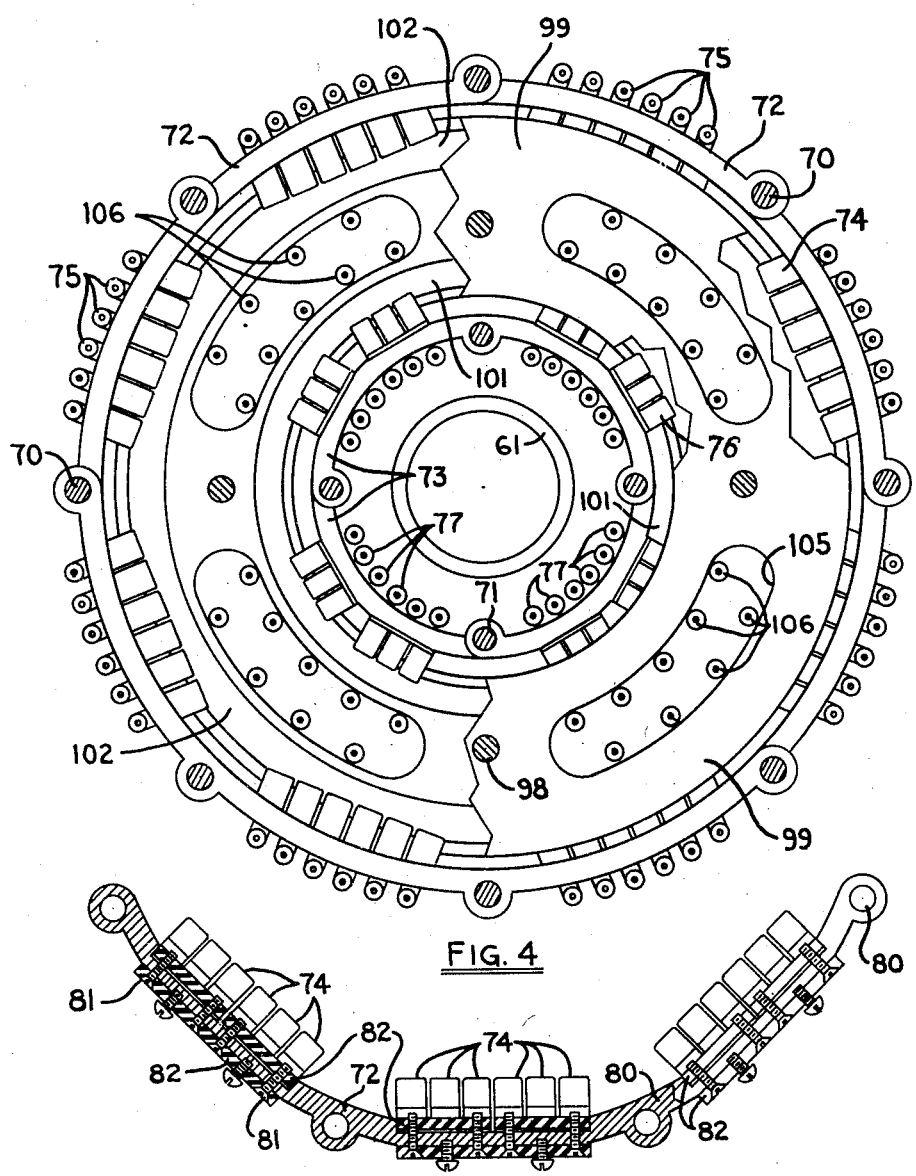
FIG. 4
FIG. 5
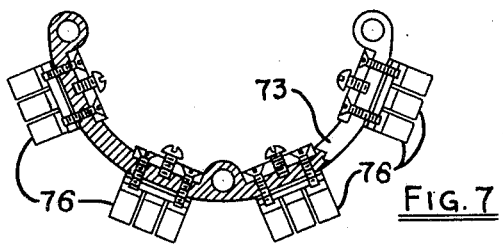
FIG. 7
*INVENTORS*
JAMES A. S. ROY
DANIEL E. SCHWARTZ
BY
ATTYS.

United States Patent Office 2,820,207
Patented Jan. 14, 1958

2,820,207

ELECTRIC ROTARY MULTICONTACT DEVICE

James A. S. Roy, Herndon, Va., and Daniel E. Schwartz, Silver Spring, Md.

Application September 27, 1954, Serial No. 458,723

8 Claims. (Cl. 339—5)

(Granted under Title 35, U. S. Code (1952), sec. 266)

The invention described herein may be manufactured and used by or for the Government of the United States of America for governmental purposes without the payment of any royalties thereon or therefor.

This invention relates to electrical rotary multicontact devices and more particularly to relatively rotatable structural brush and slip-ring stacks for transmitting a plurality of isolated electrical potentials and currents from stationary to rotatable elements without interruption irrespective of the number of revolutions of the rotatable member with respect to the stationary member in either rotative direction.

In most well known rotary contact devices the angular rotation between members is restricted to less than 360 degrees or, where the members have a full 360 degree rotation, the electrical connections are made by electrical cables which are of sufficient length to wind for 360 degrees. These known types are not desirable for many applications, as in making electrical connections to gun turrets, rotatable antennas, and the like, since in both types a reversal of rotative direction is necessary where in these applications it may be desirable to continue rotation in the same angular direction. Where in some known rotary contact devices the above two types are combined utilizing cables to connect the contacts on the rotary member of the device, the cables are cumbersome and are often swung in the way of operator personnel.

In the present invention an electrical rotary contact device is provided in which a rotatable contact member is unrestricted in its relative rotation in either rotative direction with respect to a stationary contact member and a plurality of isolated circuits is established between the stationary and rotary members through a plurality of isolated companion brush and slip ring elements. The brushes can be fixed to the stationary member and the slip rings can be fixed to the rotary member, or vice versa. Each brush and each slip ring is electrically connected to a terminal on a terminal connector block supported respectively by the stationary member and the rotary member through an electrical conductor. Electrical connections in and out of the rotary multicontact device are made to terminals on these terminal blocks. The rotary contact device, in use, is fastened or attached by its stationary member to the base member of the gun turret, camera mount, or the like, on which the device is used and the rotatable member is coupled to rotate with the gun, camera, or the like, with the axes of rotation coincident. In this manner direct electrical connections can be made from the terminal block on the rotatable contact member to the electrical terminals on the gun, camera, or the like, without the necessity of swinging a cable about. A cable may connect the terminals on the terminal block of the stationary contact member to the various sources of potential and control circuits, where desirable, which cable will not be disturbed in the rotative operation of the rotatable contact member. It is therefore a general object of this invention to provide a rotary multicontact device for transmitting electrical potentials and control currents to elements of a rotatable mechanism in which the device is capable of rotating unlimited revolutions in either rotative direction and is devoid of cumbersome or obstructive electrical cables.

These and other objects, advantages, features, and uses will become more apparent as the description proceeds when taken in consideration of the accompanying drawings, in which:

Fig. 4 is a cross-sectional view of the modification shown in Fig. 3 taken along the line 4—4 looking in the direction of the arrows;

Fig. 5 is a partly sectioned and partly planned view of the outer brush holder;

Fig. 7 is a partly sectioned and partly planned view of the inner brush holder;

Figure 1:
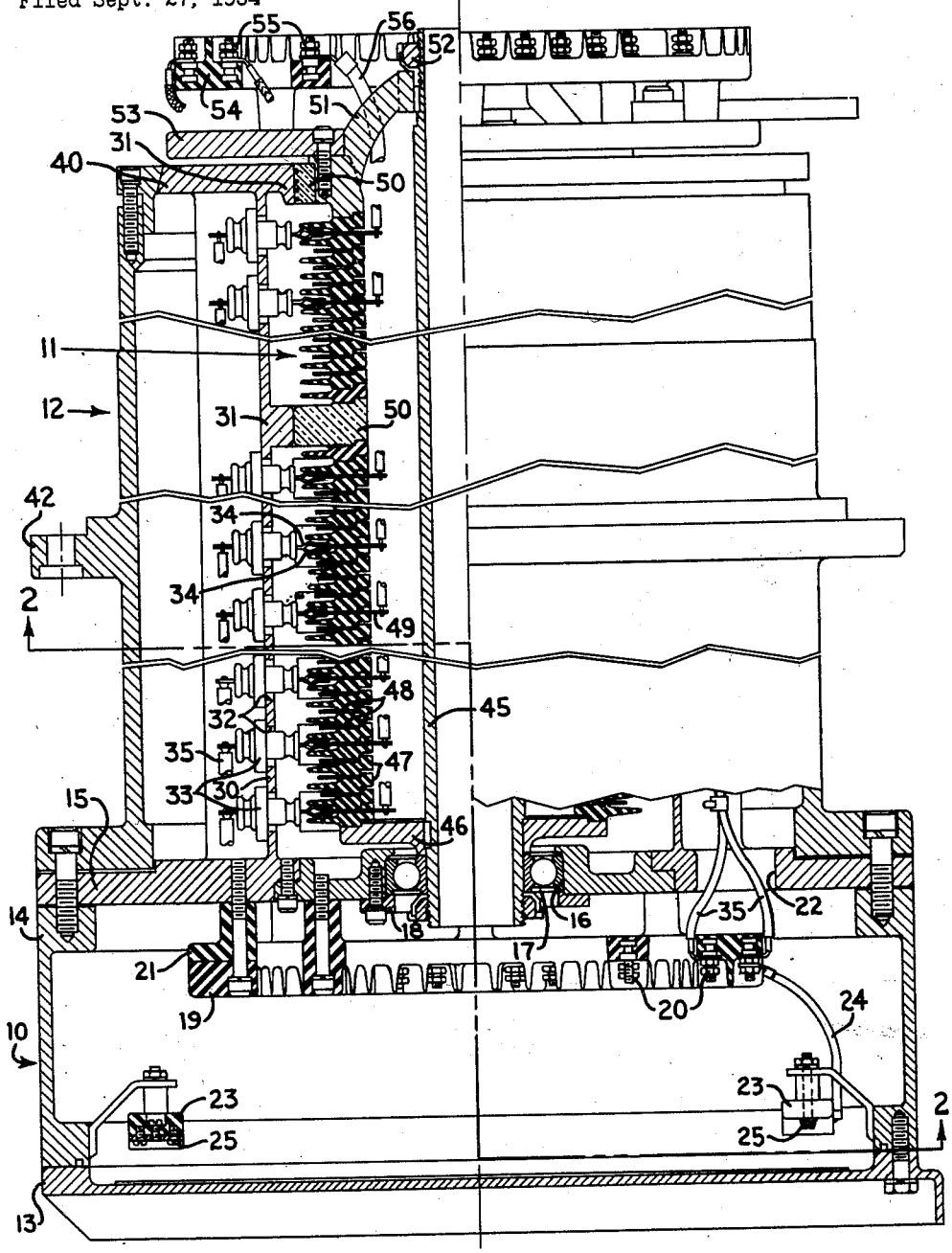
Fig. 1 is a partially elevational and partially sectional side view of one modification of the rotary multicontact device constructed in accordance with the invention.
Figure 2:
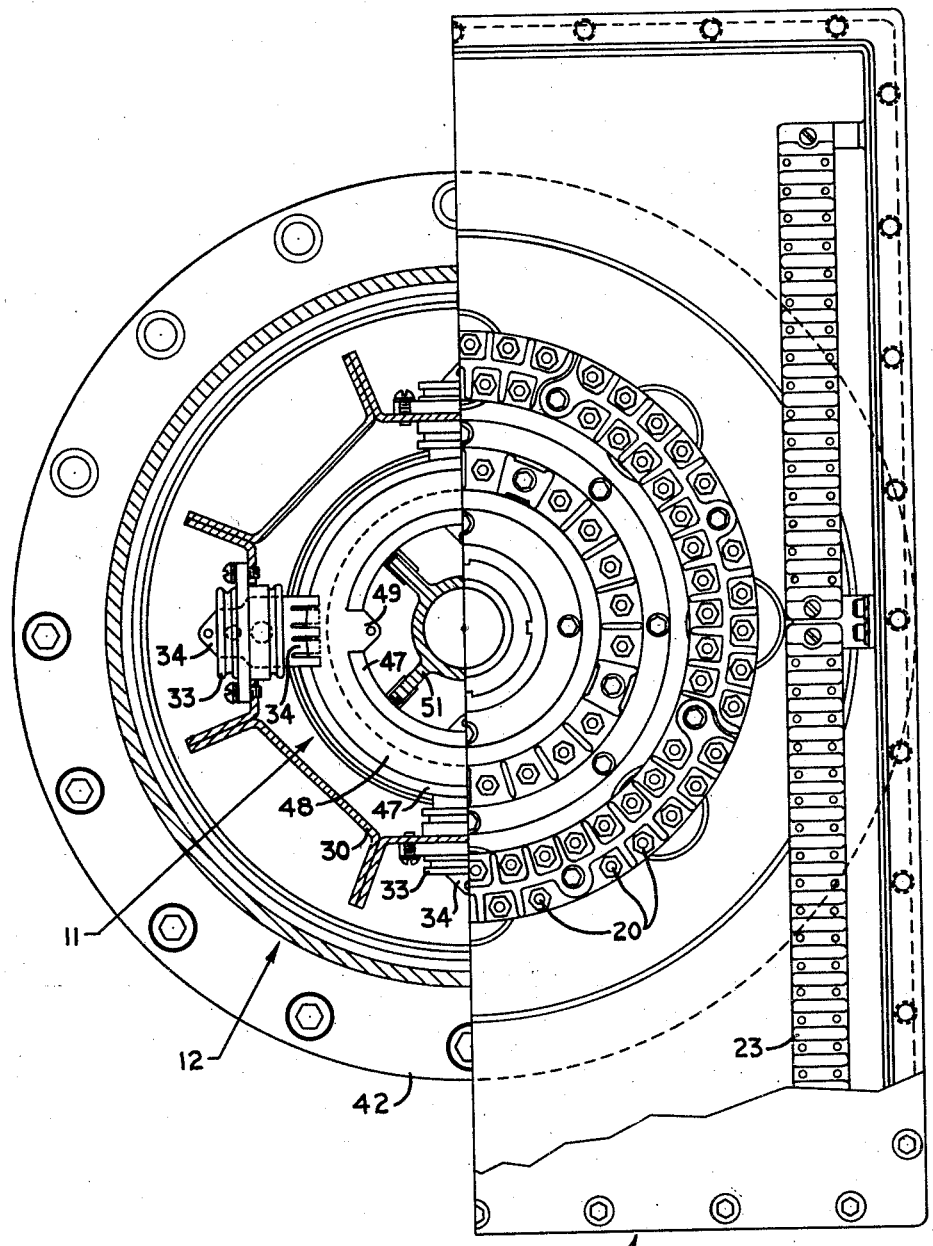
Fig. 2 is an end view partly in plan and partly sectional of the modification shown in Fig. 1, the sectional part looking along the line 2—2 in the direction of the arrows in Fig. 1.

Referring more particularly to Figs. 1 and 2, there is shown a rotary contactor device having a base component, generally referred to by the reference character 10, a rotatable component, generally referred to by the reference character 11, and a cover component, generally referred to by the reference character 12. The base component 10 may be constructed of several elements to facilitate manufacture and assembly and is herein shown as consisting of a base plate 13, a ring spacer 14, and a top plate 15, all bolted together to form a unit base. The top plate 15 has a central opening 16 for supporting a bearing assembly 17, preferably of the roller type, supported in the opening by a collar 18 bolted to the top plate 15, as is well understood in the art. Also bolted to the underside of the top plate 15 is an electrical connection block 19 of non-conductive material having a plurality of connection terminal screws 20 fixed thereon. This terminal block 19 is spaced from the bottom side of the top plate 15 by spacers 21 so that electrical conductors may be brought in from the brushes, soon to be described, through openings 22 through the top plate 15. Where desirable, secondary connection blocks 23 may be used near the lower end of the ring spacer 14 to which conductors, as 24, may be connected from the terminal screws 20 to terminal screws 25 to facilitate access by operator or maintenance personnel. The base component 10 can be square or round but is herein illustrated as being square. It also may be desirable to make the top plate 15 in two separable elements as illustrated whereby the element supporting the bearing assembly 17 can be bodily removed.

On the top surface of the top plate 15 is a polygonal-shaped hollow stack 30, concentrically upstanding, having spaced internally faced journals 31 and having a plurality of radial openings 32 therein. In each of the radial openings is an electrical brush holder 33 having a brush element 34 therein. The brush holders 33 are positioned in four vertical rows about the stack 30, the rows each being vertically offset from the other rows and the holders of each row being uniformly spaced to position each brush element 34 on a different horizontal plane. Each brush element 34 is connected by a conductor, as illustrated by conductors 35, to one each of the terminal screws 20.

The top of the stack 30 has a radially extending flange 40 the outer periphery of which is fastened by cap screws, or the like, to the top of the cover component 12. The bottom of the cover component 12 is fixed, as by cap screws, to the top plate 15 enclosing the stack 30 with the brushes 33 thereon. The cover component 12 may have a radial flange, as illustrated at 42, to mount the device in a place of use.

Supported by the inner member of the bearing assembly 17 is a tubular post 45 on the bottom end of which is fixed in any suitable manner a radial flange 46. Stacked on the flange 46 are a plurality of annular electrical insulator disks 47 and annular slip rings 48 in alternate relation to electrically insulate each slip ring. The outer periphery of each slip ring 48 is continuous and slips in one each of the brush elements 34. The inner periphery of each slip ring 48 has a connection lug 49 extending freely into the annular space between the stack 47—48 and the tubular post 45. The stack 47—48 has annular journal elements 50 spaced to cooperate with the journals 31 of the stack 30. The stack 47—48 is topped by a spider member 51 having a central opening through which passes the tubular post 45. A nut 52 is threaded on the end of the post 45 to hold the stack 47—48 together as a unit rotatable with the slip rings 48 slidable in the brushes 34. The spider 51 supports a radial flange 53 which also supports a circular connection disc 54 of electrically non-conductive material. A plurality of circular concentric rows of terminal posts 55 are fixed to the connection disc 54 and one each slip ring 48 is connected by a conductor 56 to one each of the terminal posts 55. As now may be apparent, the rotatable component 11 consisting primarily of the tubular post 45, the stack 47—48, the spider 51, and the connector disc 54 all rotate in unison with respect to the base component 10 and the cover component 12. Electrical connections are established through a terminal post 25 on the terminal block 23 in the base, via the elements 24, 20, 35, 34, 48, 56, and 55, the terminal 55 being connectible to the desired element of a rotatable device, as a gun, camera, or the like (not shown) which has its axis of rotation coincident with the axis of the tubular post 45. A plurality of isolated electrical circuits can thus be established between relatively rotatable parts.

Figure 3:
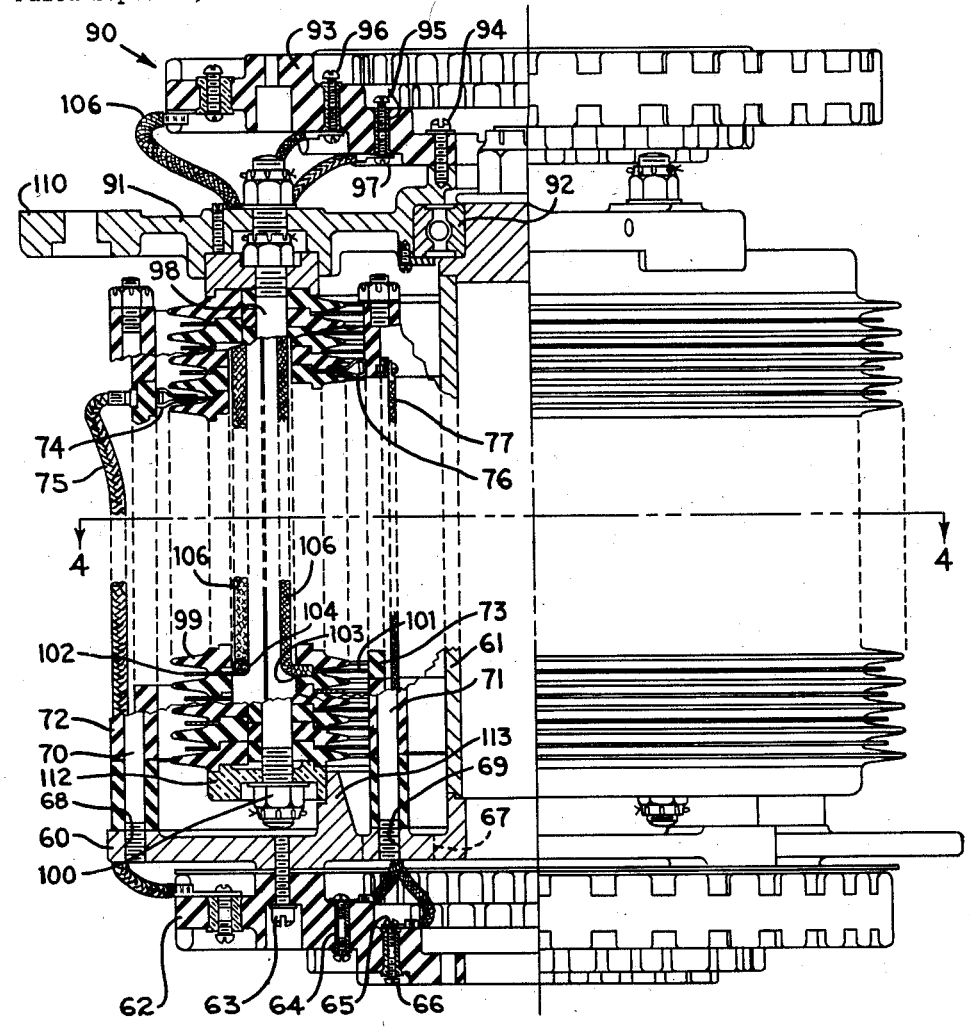
Fig. 3 is a side view, partly in elevation and partly in section of another modification of the invention.

Referring now more particularly to Figs. 3 and 4, a modification of the rotatable contact device is illustrated which is similar in many respects to the modification illustrated in Figs. 1 and 2. In this illustration a base member 60 supports a centrally upstanding tubular post 61 fixed thereto in any suitable manner. On the underside of the base member 60 is a terminal block 62 of electrically non-conductive material fastened as by screws 63. The terminal block 62 has a plurality of contact sleeves 64 extending therethrough with a terminal screw on each end of the sleeve, the terminal screws 65 adaptable to have conductors connected thereto from brushes, as will soon be described, and the terminal screws 66 adapted to be connected to electrical sources or controls (not shown). The base member 60 has a plurality of concentrically positioned openings 67 through which electrical conductors may pass. The base member 60 also has a plurality of threaded or tapped openings in two concentric circles 68 and 69 into which are threaded rods 70 and 71, respectively. The rods 70 support stacked outer semi-circular ring brush holder elements 72, more particularly shown in Figs. 5 and 6 and soon to be described, which are stacked in overlapping relation around the rods 70. The rods 71 support stacked inner semi-circular ring brush holders elements 73, more particularly shown in Fig. 7 and soon to be described, which are stacked in overlapping relation around rods 71. Each brush 74 on the brush holder elements 72 is connected by an electrical conductor 75 to one each terminal screw 65, the conductor passing along the outside of the stacked brush holder elements.

Each brush 76 on the brush holder elements 73 is connected to one each terminal 65 by an electrical conductor 77 by passing through the openings 67. The number of rods 70 and 71 used is a matter of choice but for illustrating the invention herein eight such rods 70 are shown and four such rods 71 are shown (see Fig. 4).

Figure 6:
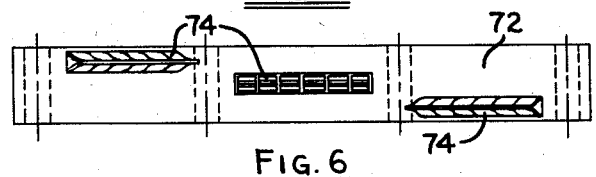
Fig. 6 is a side elevational view of the brush holder of Fig. 5.
Figure 8:
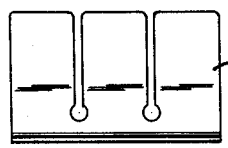
Fig. 8 is a side elevational view of an electrical brush component.
Figure 9:
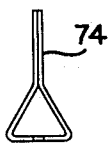
Fig. 9 is an end elevational view of the electrical brush component as seen in Fig. 8.

Referring now more particularly to Figs. 5 to 9, inclusive, the element 72 is shown semi-circular and with four bores 80 therethrough to permit the element to be slid over four of the rods 70. The brush elements 74, as particularly shown in Figs. 8 and 9, are fastened to the outer element 72 by screws 81 with the brush elements 74 directed inwardly. The mounting strips 82 are used to facilitate mounting on a non-conductive material. It may be noted that two sets of brush elements 74 are used on the outer brush holder elements 72 and only one such brush element is used on the inner brush holder elements 73 whereby the heavier currents may be transmitted through the outer brushes and companion slip rings while the lower currents may be transmitted through the inner brushes and companion slip rings. The brush elements 74 are in groups between the posts 70 or 71 and each group is positioned on a different horizontal level, as shown in Fig. 6, so that each group of brushes engage a different slip ring. By distributing the brush elements radially about the slip rings and vertically in different planes, a great many separate circuits are established through the rotary contact device in a very compact manner.

Referring again to Figs. 3 and 4, the rotatable component, generally referred to by the reference character 90, includes a spider member 91 centrally journaled on the tubular post 61 by a bearing assembly 92. On the top side of the spider 91 is fixed a connection block 93 as by cap screws 94. A plurality of connection sleeves 95 pass through the connection block 93, the top end of each sleeve having a terminal screw 96 and the bottom end of each sleeve having a terminal screw 97 therein. The spider 91 is herein shown as having four legs although any number of legs may be used. On each leg there is suspended a rod 98 which depends within the annular space between the outer and inner stacks of brushes 74 and 76. On the rods 98 are stacked a plurality of annular electrically non-conductive rings 99 which are supported between the spider 91 and a nut 100 threaded on the lower ends of the rods 98. The insulator rings 99 have shoulders thereon to produce annular channels into which inner slip rings 101 and outer slip rings 102 are loosely supported. The insulator rings 99 are each slotted in order that each slip ring may have a connector lug to pass through the insulator rings, the inner slip rings 101 having connector lugs 103 thereon and the outer slip rings 102 having connector lugs 104 thereon. Each insulator ring 99 has arcuate slots 105 therein, as best seen in Fig. 4, through which electrical conductors 106 pass to be connected from the slip rings to separate terminal screws 97 on the connector block 93. Electrical circuits can therefore be established from the terminal posts 66 on the stationary connection block 62 to the terminal screws 96 on the rotatable connection block 93. An outstanding lug 110 on the spider member 91 may be used to connect the rotatable component 90 to the rotatable device to be served (not shown). It is believed to be apparent from the above description that a great number of isolated electrical circuits can be established between a stationary source or control service and a rotatable device through the use of the rotary contactor device by mounting the rotary contactor device on substantially the same axis as the rotatable device and connecting the voltage source or control circuits to the terminals 66 and the rotatable device circuits to the terminals 96. Since the rotatable component 90 has absolute rotary freedom, the rotatable device, as an antenna, gun, or the like (not shown), will be unrestricted in its rotary movement. For high carrying currents the outer brushes may be used wherein the circuit is established through the following elements: 66, 75, 74, 102, 106, and 96. For lower carrying currents the inner brushes may be used via 66, 77, 76, 106 and 96. The rotary component 90 rotates on the bearing assembly 92 which rotation causes all the inner and outer slip rings 101 and 102 to slide in their respective brush elements 76 and 74. Where desirable, the lower end of the stack of insulator elements 99 and slip rings 101 and 102 may have a ring member 112 in journaled relation with an upstanding rib 113 on the base plate 60 to stabilize the rotatable component 90 against lateral swing.

The operation of both modifications shown and described are believed to be apparent from the above disclosure wherein it is readily understood that either modification permits unrestricted rotation in either rotative direction and without the necessity of swinging any cables to the rotatable device serviced. The height of the stack of annular insulator rings and slip rings can be made to suit the need of the circuits to be transmitted. The modification shown and described for Figs. 3 and 4 is capable of handling substantially double the number of circuits handled by the modification shown in Figs. 1 and 2 for the same height although requiring slightly more space in diametrical extent. The plurality of brush fingers of the brush element 74 insures an uninterrupted circuit connection with the respective slip ring insuring smooth and accurate operation of the rotatable device served.

In conclusion, it is desired to point out that in addition to the maintenance of electrical continuity throughout any number of complete revolutions, the multicontact device further maintains that continuity under all conditions of shock such as naval gun fire. Since one of the uses of the device is aboard ship, it follows that every circuit actively involved in the fire control apparatus must remain closed and proof against even the slightest disruption during the heavy vibrations set up by a battle action.

While many modifications and changes may be made in the constructional details and features without departing from the spirit and scope of the invention, we desire to be limited only in the scope of the appended claims.

What is claimed is:

1. An electrical rotary multicontact device comprising; a stationary member and a rotatable member rotatively supported by said stationary member, said stationary member having two upstanding cylindrical walls providing an annular cylindrical space therebetween concentric with the axis of said rotatable member; a plurality of electrically isolated electrical brush elements extending into said cylindrical space from both said cylindrical walls; a cylindrical wall on said rotatable member depending into said cylindrical space and having a plurality of electrically isolated inner and outer conductor rings, one each inner ring being in slidable contact with one each electrical brush element extending from said inner wall and one each outer conductor ring being in slidable contact with one each electrical brush extending from said outer wall; and means connecting each brush element exteriorly of said stationary member and each conductor ring exteriorly of said rotatable element whereby a plurality of isolated electrical circuits may be established between relatively rotatable parts through the rotary multicontact device.

2. An electrical rotary multicontact device as set forth in claim 1 wherein said cylindrical wall on said rotatable member depending into said cylindrical space is accomplished by a spider on said cylindrical wall journaled by a bearing assembly to a post on said stationary member, and said means connecting each brush element and each conductor ring exteriorly thereof is a connector block carried respectively by the rotatable and stationary members.

3. An electrical rotary multicontact device comprising; a stationary member and a rotatable member rotatably supported by said stationary member, said stationary member having two upstanding cylindrical walls consisting of concentrically stacked electrical insulator rings providing an annular cylindrical space therebetween concentric with the axis of said rotatable member; a plurality of electrical brush elements supported by both said insulator ring stacks and extending into said cylindrical space in different planes normal to the axis of said rotatable member; a spider rotatable on said stationary member; a cylindrical wall supported by said spider consisting of a stack of annular electrical insulators extending into said annular space; a plurality of inner and outer annular slip rings supported by said annular insulators isolating each slip ring electrically, one each outer slip ring being engaged by one each brush on the outer cylindrical wall and one each inner slip ring being engaged by one each brush on the inner cylindrical wall; a connection block carried by said stationary member and having one each terminal thereof connected to one each brush; and a connection block carried by said rotatable member and having one each terminal thereof connected to one each slip ring whereby a plurality of separate electrical circuits may be established between relatively rotatable parts with the rotary multicontact device thereon by connection to corresponding terminals of the connection blocks on said stationary and rotatable members.

4. An electrical rotary multicontact device as set forth in claim 3 wherein said brushes on said outer cylindrical wall are of greater current carrying capacity than said brushes on said inner cylindrical wall.

5. An electrical rotary multicontact device comprising; a stationary member; a rotatable member journaled in said stationary member, said rotatable member consisting of a central post on the axis of rotation supporting a plurality of concentrically stacked slip rings with electrical insulators therebetween, said insulators having a peripheral extension over the outer peripheral portion of adjacent slip rings; a plurality of brush elements, one for each slip ring, supported by said stationary member in insulated stacked relation concentrically around said slip rings for each to slidably contact the outer peripheral portion of one each slip ring between said insulator peripheral extensions in all rotative positions of said rotatable members; an electrical terminal block supported by said rotatable member with each terminal thereof electrically coupled to one each slip ring on the inner peripheral edge thereof; and an electrical terminal block supported on said stationary member with each terminal thereof electrically coupled to one each brush element whereby a plurality of isolated electrical circuits may be established in all rotative positions of said rotatable member by electrical connections to corresponding terminals of said terminal blocks.

6. An electrical rotary multicontact device as set forth in claim 5 wherein said brush elements stacked concentrically around said slip rings are arranged in helix relation to prevent congestion of said brush elements.

7. An electrical rotary multicontact device comprising; a stationary member and a rotatable member rotatably supported by said stationary member on an axis passing through said members; an electrical terminal block on each member; a plurality of stacked annular disk slip rings carried by one of said members concentric with said axis with each slip ring being electrically connected to one each terminal on said terminal block carried by said one of said members, said stacked slip rings being in two concentric stacks providing inner and outer slip rings electrically isolated; annular insulator rings separating said slip rings with a peripheral portion of each insulator ring extending beyond the peripheral portion of adjacent slip rings and separated therefrom; and a plurality of bifurcated brush elements insulatingly carried by the other of said members with each bifurcated portion thereof slidably gripping the opposite sides of a slip ring between adjacent insulator ring peripheral extending portions and being electrically connected to one each terminal block carried by said other of said members, said brush elements consisting of a plurality of outer brushes facing radially inward to engage said outer slip rings and a plurality of inner brush elements facing outwardly to engage said inner slip rings, the brush elements being circumferentially staggered in the different planes of said slip rings whereby a plurality of separate circuits are established between the terminals of the relatively rotatable terminal blocks in a compact manner.

8. An electrical rotary multicontact device as set forth in claim 7 wherein said inner and outer slip rings are insulatingly supported in groups consisting of an inner and an outer slip ring each group being displaced by planes normal to the axis of said rotatable member.

References Cited in the file of this patent

UNITED STATES PATENTS

| | | |
|---|---|---|
| 2,231,149 | Baum | Feb. 11, 1941 |
| 2,319,443 | Corte | May 18, 1943 |
| 2,581,266 | Lum | Jan. 1, 1952 |
| 2,662,130 | Sealey | Dec. 8, 1953 |
| 2,751,565 | Johnston | June 19, 1956 |
| 2,774,831 | Lafferty et al. | Dec. 18, 1956 |